US012565011B2

(12) United States Patent
Heltsch et al.

(10) Patent No.: US 12,565,011 B2
(45) Date of Patent: Mar. 3, 2026

(54) METHOD FOR BONDING TWO FIBER COMPOSITE COMPONENTS WITH EACH OTHER TO FORM A FIBER COMPOSITE STRUCTURE

(71) Applicant: Airbus Operations GmbH, Hamburg (DE)

(72) Inventors: Norbert Heltsch, Hamburg (DE); Peter Linde, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 189 days.

(21) Appl. No.: 18/164,045

(22) Filed: Feb. 3, 2023

(65) Prior Publication Data

US 2023/0302740 A1    Sep. 28, 2023

(30) Foreign Application Priority Data

Mar. 3, 2022    (EP) ..................................... 22159936

(51) Int. Cl.
B29C 65/00 (2006.01)
B29C 65/34 (2006.01)
(Continued)

(52) U.S. Cl.
CPC ...... B29C 65/3436 (2013.01); B29C 65/4835 (2013.01); B29C 66/45 (2013.01);
(Continued)

(58) Field of Classification Search
CPC ... B29C 65/30; B29C 65/342; B29C 65/3436; B29C 65/3444; B29C 65/3492; B29C 65/3496
See application file for complete search history.

(56) References Cited

U.S. PATENT DOCUMENTS

| 2006/0172645 | A1 | 8/2006 | Weerth |
| 2018/0222172 | A1* | 8/2018 | Backhouse ............. F02K 1/827 |
| 2019/0091940 | A1 | 3/2019 | Linde et al. |

FOREIGN PATENT DOCUMENTS

| EP | 3461620 B1 | 5/2021 |

OTHER PUBLICATIONS

European Search Report dated Sep. 1, 2022; priority document.

* cited by examiner

*Primary Examiner* — Philip C Tucker
*Assistant Examiner* — Nickolas R Harm
(74) *Attorney, Agent, or Firm* — Greer, Burns & Crain, Ltd.

(57) ABSTRACT

A method for bonding two fiber composite components with each other to form a fiber composite structure includes integrating conductive fibers underneath a bonding surface of at least one of the two fiber composite components, each conductive fiber comprising a carbon fiber coated with an electrically insulating coating, the conductive fibers running along the bonding surface and protruding at least at their ends from the respective fiber composite component; arranging the two fiber composite components against each other at their respective bonding surfaces; passing an electric current through the conductive fibers by electrically contacting the conductive fibers at their protruding ends so that the respective fiber composite component is heated at the bonding surface to a curing temperature; and joining the two fiber composite components with each other at their bonding surfaces via secondary bonding, co-bonding and/or co-curing at the curing temperature, thereby forming the fiber composite structure.

8 Claims, 1 Drawing Sheet

(51) Int. Cl.
*B29C 65/48* (2006.01)
*B29C 65/30* (2006.01)
*B29L 31/30* (2006.01)

(52) U.S. Cl.
CPC ...... *B29C 66/721* (2013.01); *B29C 66/91221*
(2013.01); *B29C 66/91655* (2013.01); *B29C
65/30* (2013.01); *B29C 65/342* (2013.01);
*B29C 65/3444* (2013.01); *B29C 65/3492*
(2013.01); *B29C 65/3496* (2013.01); *B29L
2031/3076* (2013.01)

METHOD FOR BONDING TWO FIBER COMPOSITE COMPONENTS WITH EACH OTHER TO FORM A FIBER COMPOSITE STRUCTURE

CROSS-REFERENCES TO RELATED APPLICATIONS

This application claims the benefit of the European patent application No. 22159936.8 filed on Mar. 3, 2022, the entire disclosures of which are incorporated herein by way of reference.

FIELD OF THE INVENTION

The present invention pertains to a method for bonding two fiber composite components with each other to form a fiber composite structure, a fiber composite structure formed with such a method, an aircraft having such a fiber composite structure and a fiber composite component for use in such a method.

BACKGROUND OF THE INVENTION

Although applicable in a wide variety of applications, the present invention and the underlying problem will be explained in more detail with reference to passenger aircraft. However, the methods and devices described can also be used in various vehicles and in all areas of the transportation industry, for example, for road vehicles, for rail vehicles, for general aircraft or for watercraft. In addition, the present processes and devices can be used in the manufacture of general fiber composite structures.

Aircraft manufacturing is inherently low volume and is commonly characterized by a large amount of skilled handwork and complex assembly setups. Bonding of structural aircraft composites is an interesting alternative to riveting and may offer various advantages such as improved structural integrity and the possibility to use thinner parts (weight saving). Three types of bonding are commonly employed for manufacture of composite aircraft structures: secondary bonding, co-bonding and co-curing. Secondary bonding is the adhesive joining of two precured parts. Co-bonding is the process where a cured component is laid up against an uncured component with an adhesive at the interface. Co-curing is the simultaneous cure of two uncured or partially cured parts in contact with or without an included adhesive film.

A typical bonding process for two fiber composite components involves surface preparation, application of film or paste adhesive and the subsequent application of high pressure and temperature, either by means of an autoclave or an "out-of-autoclave" process, for example, based on an oven or infrared heating. In this respect, out-of-autoclave bonding has obtained widespread interest in roughly the last decade. The basic physics are the same as in case of conventional autoclave approaches, however, new materials have been developed (including adhesives) that do not require as high temperature and pressure during the curing process. However, these approaches usually require complex assembly setups including vacuum bagging of at least a mating portion of both components as well as large amounts of energy for the subsequent curing under application of temperature.

Recently, increased focus has been put on approaches that apply the heating energy "in-situ", that is, more or less directly in the material of the components. For example, prior art document EP 3 461 620 B1 describes a method for the resistance welding of thermoplastic components, which relies on carbon fibers as integrated heating elements. The carbon fibers are coated with a solid polymer electrolyte with a thickness of several hundred nanometers, which may be applied by means of an electrochemical bath. Among other things, this coating has an electrically insulating effect, although the fiber diameter is only increased by about one micrometer due to the coating. A coating of this type can withstand high temperatures of up to over 700° C.

Against this background, it is an object of the present invention to find improved solutions for out-of-autoclave bonding of fiber composite parts.

SUMMARY OF THE INVENTION

According to the invention, a method for bonding two fiber composite components with each other to form a fiber composite structure comprises integrating conductive fibers underneath a bonding surface of at least one of the two fiber composite components, each conductive fiber comprising a carbon fiber coated with an electrically insulating coating, the conductive fibers running along the bonding surface and protruding at least at their ends from the respective fiber composite component; arranging the two fiber composite components against each other at their respective bonding surfaces; passing an electric current through the conductive fibers by electrically contacting the conductive fibers at their protruding ends so that the respective fiber composite component is heated at the bonding surface to a curing temperature; and joining the two fiber composite components with each other at their bonding surfaces via secondary bonding, co-bonding and/or co-curing at the curing temperature, thereby forming the fiber composite structure.

Further according to the invention, a fiber composite structure is manufactured with the method according to the invention.

Further according to the invention, an aircraft comprises a fiber composite structure according to the invention.

Further according to the invention, a fiber composite component for use in a method according to the invention comprises conductive fibers integrated underneath a bonding surface of the fiber composite component, each conductive fiber comprising a carbon fiber coated with an electrically insulating coating, the conductive fibers running along the bonding surface and protruding at least at their ends from the fiber composite component, wherein the fiber composite component is formed with a matrix material at least at the bonding surface curable under application of a curing temperature.

Thus, one idea of the present invention is to provide out-of-autoclave bonding of fiber composites parts with an in-situ heating source by means of carbon fibers inside the adhered parts, the fibers being coated with electrically insulating material. In this case, no external heating sources are necessary, and the heat is introduced exactly only where it is needed, that is, at the bonding area of the two adherent parts. The invention can be used for various bonding approaches where partially cured, semi-cured and/or uncured parts and/or adhesives are hardened under application of temperature (and optionally pressure). In other words, the invention can be used for secondary bonding, co-bonding as well as co-curing of fiber composites, e.g., based on thermosetting polymers (resins) with embedded reinforcement fibers made from carbon, glass and/or aramid, for example.

Due to the electrically insulating coating of the conductive fibers, leakage currents or similar effects can be significantly reduced or even completely avoided, since the fibers can easily touch each other without causing a leakage current or even a short circuit. This means that heat losses can be minimized and avoided as far as possible. Such coatings of carbon fibers can be produced relatively inexpensively and time-efficiently with a very high temperature stability of up to over 700° C., even in mass production.

A further advantage of the invention arises from the fact that the carbon fibers of the conductive fibers can serve directly as reinforcing fibers of the fiber composite components and form a natural component thereof, without discontinuities or electrochemical reactions occurring. The electrically insulating coating can also be optimized in such a way that the bonding behavior is not impaired, i.e., the conductive fibers exhibit similar bonding behavior to uncoated carbon fibers. The fibers can be placed and oriented very flexibly in the adhered parts, e.g., in locations where no external heat source would fit.

In principle, the conductive fibers can be processed and treated in the same way as normally used uncoated carbon fibers. In addition, the conductive fibers can even function directly as reinforcing fibers of the fiber composite component. In principle, however, it is also intended to integrate the conductive fibers into the fiber composite component only after production, e.g., by providing feed-through openings in the fiber composite component into which the conductive fibers can be inserted. Advantageously, the conductive fibers can be integrated into the fiber composite components near the surface. The integration can thus be optimized according to the joining areas to be used later during the bonding process. For example, the conductive fibers can be integrated into the fiber composite component close to a surface and essentially parallel to it, whereby the surface can subsequently be used as joining area.

By avoiding an autoclave curing approach, the invention reduces labor costs and lead time significantly. The total cycle time can be shortened, since the temperature in the bond line is reached considerably faster than by external heating sources (warm up phase shortened). Moreover, costs are also reduced by avoiding consumables resulting in a significant reduction in manufacturing waste. The invention systematically reduces rework by preceding non-destructive inspection of parts and enables industrial scaling of the process chain by modest NRC requirements.

According to an embodiment of the invention, the electrically insulating coating may be a polymer electrolyte coating.

The polymer electrolyte coating may particularly be a solid polymer electrolyte coating. For example, the polymer electrolyte coating can contain a methoxy polyethylene glycol monomethacrylate. Such polymer electrolyte coatings can have a temperature resistance of up to several hundred degrees Celsius, yet at the same time offer excellent bonding properties for incorporation into fiber reinforced components, e.g., carbon fiber-reinforced thermoset materials, like epoxy resins.

According to an embodiment, the electrically insulating coating may have a thickness in the range of 0.1 micrometer to 1 micrometer. In particular, the electrically insulating coating may have a thickness of 0.5 micrometers. For example, the carbon fibers may have a diameter between 6 and 7 micrometers, resulting in a diameter of the conductive fibers of about 7 to 8 micrometers.

According to an embodiment of the invention, joining may comprise pressing the two fiber composite components against each other at the bonding surfaces.

In principle, however, depending on the application, it may also be sufficient merely to bring the two fiber composite components into contact, for example by placing one fiber composite component on the other fiber composite component at the bonding surface. However, applying a force or pressure to press the fiber composite components against each other can improve the quality of the bond connection in some applications. In particular, this can ensure that the two fiber composite components are in close contact over the entire joining surface and that the specified curing temperature is achieved and maintained accordingly over the entire joining surface.

According to an embodiment of the invention, arranging may comprise providing an adhesive between the bonding surfaces.

For example, a paste adhesive may be applied on the bonding surface of one or both of the components, e.g., an adhesive with a curing temperature below 150° C., e.g., 120° C. or lower. It is to be understood however that other embodiments of the invention do not necessarily require an adhesive to provide a strong bond between the components. For example, two semi-cured fiber composite components may be directly fused with each other by adequate application of a curing temperature and optionally pressure (co-curing).

According to an embodiment of the invention, the conductive fibers may be arranged in the form of single fibers, bundles, tapes, scrims, mats, woven fabrics and/or fleece or the like.

In principle, the conductive fibers can be arranged or integrated in different variants known to the skilled person, as they are known from the general production of fiber composite components.

According to an embodiment of the invention, the method may further comprise measuring the curing temperature and controlling the electric current based on the measured curing temperature.

In this embodiment, the current conducted through the conductive fibers can be adjusted at any time if there should be a local or global deviation from a predefined curing temperature, e.g., due to material defects or handling errors when arranging the fiber composite components or the like.

According to an embodiment of the invention, the curing temperature may be measured with a thermographic camera and/or a temperature sensor integrated in at least one of the fiber composite components.

For example, one or more thermal imaging cameras can be used, which convert the infrared radiation emitted by the fiber composite components into electrical signals and detect them.

An integrated temperature sensor offers the advantage that the temperature can be measured directly in the joining area or on the joining surface, or at least close by. This makes it possible to obtain as realistic a picture as possible of the bonding process and, based on this, to control it optimally.

It is to be understood however that also other direct or indirect measuring techniques may be utilized for this purpose. For example, current voltage and/or current through the fibers may be monitored in order to assess their conductivity, which in turn may serve as an indicator for the current temperature within the material (the conductivity of carbon fibers increases with increasing temperature).

According to an embodiment of the invention, the curing temperature may be below 150° C., e.g., 120° C. or even lower, for example 100° C., 90° C., 80° C. or 70° C.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. In the figures, like reference numerals denote like or functionally like components, unless indicated otherwise.

DETAILED DESCRIPTION OF THE PREFERRED EMBODIMENTS

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 1:
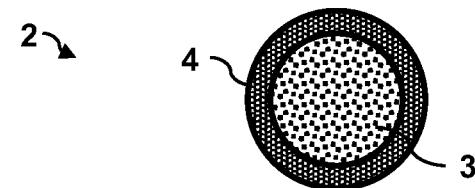
FIG. 1 schematically depicts a cross-sectional view of a conductive fiber for use in a method for bonding two fiber composite components with each other according to an embodiment of the invention.

FIG. 1 schematically depicts a cross-sectional view of a conductive fiber 2 for use in a method M for bonding two fiber composite components 1 with each other according to an embodiment of the invention.

The conductive fiber 2 comprises a carbon fiber 3, which is provided with an electrically insulating coating 4. The electrically insulating coating 4 of this embodiment is a solid polymer electrolyte coating. Such an electrochemical coating can be produced, for example, by immersing the carbon fiber 3 in a suitable electrochemical bath. In a specific example, the coating may be achieved by a polymerization of methoxypolyethylene glycol monomethacrylate. For example, the carbon fiber 3 may have a diameter between 6 and 7 microns. Such a solid polymer-electrolyte coating can be formed very thinly, for example, with a thickness of 0.5 micrometers, resulting in a total diameter of the conductive fiber 2 of about 7 to 8 micrometers. Furthermore, such a coating can withstand temperatures of several hundred degrees Celsius, making it suitable for providing in-situ thermal energy for curing adhesives and partially/semi-cured and/or uncured fiber composites in an out-of-autoclave process.

This configuration of the conductive fiber 2 offers several advantages for use in the manufacture of fiber composite structures by bonding. On the one hand, the conductive fiber 2 exhibits similar properties to an ordinary carbon fiber in structural terms as well as in terms of its compatibility with fiber composite material. For this reason, it can be readily used as a reinforcing fiber in fiber composite components or integrated into them without causing undesirable reactions. On the other hand, the solid polymer electrolyte coating is designed as an electrical insulator, which can electrically insulate a conductive fiber 2 from further conductive fibers 2 without leakage currents and/or short circuits occurring between several current-carrying and adjacent conductive fibers 2. Furthermore, such a conductive fiber 2 is sufficiently temperature resistant for the typical curing temperatures required to harden the materials typically used in out-of-autoclave bonding processes, in particular thermosetting polymers and the corresponding adhesives. In the following, with reference to the further figures, advantageous applications are explained that employ such conductive fibers 2 in a method M for bonding two fiber composite components 1 with each other to form a fiber composite structure 10.

Figure 2:
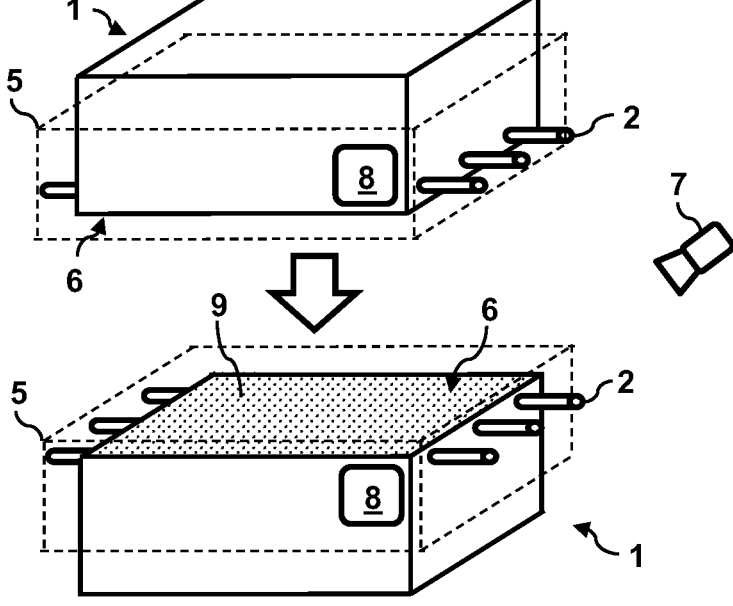
FIG. 2 shows two fiber composite components with integrated conductive fibers as shown in FIG. 1.
Figure 3:
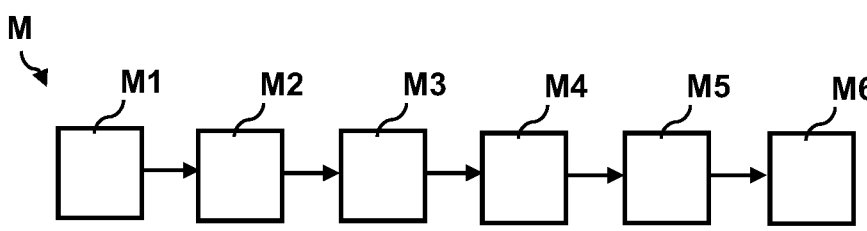
FIG. 3 is a schematic flow diagram of a method for bonding two fiber composite components with each other according to an embodiment of the invention.

FIG. 2 shows a schematic perspective view of two fiber composite components 1 with the conductive fibers 2 from FIG. 1. FIG. 3 depicts a schematic flow chart of a corresponding method M for bonding the two fiber composite components 1.

The two fiber composite components 1 may be formed from a matrix material, e.g., a thermosetting polymer like a thermoset epoxy, which embeds a plurality of reinforcement fibers, e.g., carbon fibers. The two fiber composite components 1 are shown in FIG. 2 purely schematically as identical rectangular blocks. In a specific application, the fiber composite components 1 may be, for example, structural components or parts of such components for the fuselage of an aircraft 100, e.g., a passenger aircraft (cf. FIG. 4). For example, one of the two components 1 may be a stringer, frame or other stiffening member, while the other component 1 may be an aircraft skin section. Both components 1 may be joined together in the form described herein to form a stiffened member-skin assembly, e.g., a stringer-skin assembly.

The fiber composite components 1 may be fully cured components, which means that the matrix material may be fully hardened. However, the fiber composite components 1 may also be partially cured, semi-cured and/or uncured, which means that the matrix material is not yet (fully) hardened and needs to undergo a curing process before the components 1 can be used in an aircraft assembly. In one example, one or both of the components 1 may be a laminate or pre-preg made from pre-impregnated fibers and a partially cured polymer matrix, such as epoxy or phenolic resin.

Besides the usual reinforcing fibers, both fiber composite components 1 include conductive fibers 2 as shown in FIG. 1, which are integrated underneath a respective bonding surface 6 of the fiber composite components 1. The conductive fibers 2 are oriented along the respective bonding surface 6 and protrude at both ends laterally from the respective fiber composite component 1 with respect to the bonding surface 6. This arrangement of the fiber composite components 1 and the conductive fibers 2 is to be understood purely as an example. In principle, it is left to the skilled person to introduce conductive fibers 2 as individual fibers, bundles, tapes, scrims, mats, woven fabrics and/or nonwovens or the like in a planar or other arrangement, depending on the application.

As can be seen in FIG. 2, the two fiber composite components 1 are arranged against each other at their respective bonding surfaces 6, wherein an adhesive, e.g., a temperature curable paste adhesive, is applied to at least one of the bonding surfaces 6 beforehand By contacting the laterals ends of the conductive fibers 2 with electrical cables from a current source, electric current may now be introduced in the conductive fibers, whereby the fiber composite components 1 may be heated up in a curing portion around the conductive fibers 2 by means of the Joule effect. By suitable control of the current, the curing temperature can be regulated precisely to heat-up the respective portions of the components 1 to the required temperature in a uniform way.

Depending on the type of component 1, various bonding processes may thus be realized. For example, in case both components are formed from fully hardened fiber-reinforced material, then they can be joined together at the bonding surfaces 6 by pressing them together and curing the adhesive 9 in between them (secondary bonding) Similarly, an uncured component 1 may be joined with a fully cured component 1 by means of an adhesive 9 and curing of both the adhesive 9 and the matrix material of the uncured component 1 (co-bonding). Finally, also two partially and/or uncured components 1 may be joined to each other, either with or without an additional adhesive, by heating up both components 1 to their respective curing temperature (co-curing).

Accordingly, the method M comprises under M1 (cf. FIG. 3) integrating conductive fibers 2 underneath a bonding surface 6 of at least one of the two fiber composite components 1, under M2 arranging the two fiber composite components 1 against each other at their respective bonding surfaces 6, under M3 passing an electric current through the conductive fibers 2 by electrically contacting the conductive fibers 2 at their protruding ends so that the respective fiber composite component 1 is heated at the bonding surface 6 to a curing temperature, and under M4 joining the two fiber composite components 1 with each other at their bonding surfaces 6 via secondary bonding, co-bonding and/or co-curing at the curing temperature, thereby forming the fiber composite structure 10.

For this purpose, for example, a power source can be connected to the conductive fibers 2 from outside the curing portion 5. The two fiber composite components 1 can additionally be pressed against each other with a force and/or pressure to support the bonding of the components and to achieve the most uniform temperature distribution possible or to guarantee that the fiber composite components 1 are in close contact over the entire joining area 6.

The method M can further comprise, under M5, measuring of the curing temperature and, under M4, controlling the electric current on the basis of the detected curing temperature. For this purpose, in this exemplary embodiment, a thermographic camera 7 is provided, e.g., a thermal imaging camera, which continuously detects the curing temperature so that the electric current can be adjusted locally or globally, if necessary, if there are deviations of the curing temperature from the desired temperature. Care must be taken to ensure that the curing temperature at least exceeds the minimal required temperature to harden the respectively used materials (adhesives and/or matrix materials). It is of course possible to set different curing temperatures, one after the other, or different temperatures in different portions of the components 1.

Alternatively, or additionally, the curing temperature can also be measured, for example, with temperature sensors 8, which are integrated in the fiber composite components 1 close to the conductive fibers 2 so that they can determine the temperature directly in the joining portions 5 close to the bonding surfaces 6.

Figure 4:
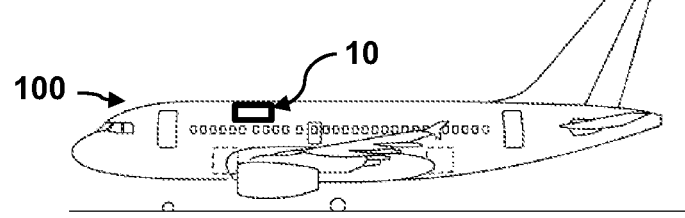
FIG. 4 schematically shows a passenger aircraft having a fiber composite structure formed with the method of FIG. 3.

As soon as the components 1 are joined to a fully cured composite structure 10, the projecting ends of the conductive fibers 2 may be cut off Such a fiber composite structure 10 can be, for example, a higher-level structural component for an aircraft 100. FIG. 4 shows an example of such an aircraft 100 in which a fiber composite structure 10 produced by the present method M is incorporated, e.g., a bulkhead, a stringer, a cross member, an outer skin section, a ceiling panel, a floor panel, and/or a wall panel, or the like.

With the aid of the method M described, it is thus possible to produce a fiber composite structure 10 from two fiber composite components 1 using an energy efficient and uncomplicated bonding process. The conductive fibers 2, which have a core of carbon fibers 3, serve here as current conductors (i.e., as resistance carriers for generating the curing heat), the individual conductive fibers 2 being insulated from one another due to the electrically insulating coating 4. This prevents leakage currents and undesirable heat losses. Carbon fibers 3 with a well-tolerated coating are used, which can be incorporated into the fiber composite components 1 without any unfavorable effects and, moreover, can be used to reinforce them.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. The embodiments were chosen and described in order to best explain the principles of the invention and its practical applications, to thereby enable others skilled in the art to best utilize the invention and various embodiments with various modifications as are suited to the particular use contemplated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 fiber composite component
2 conductive fiber
3 carbon fiber
4 electrically insulating coating
5 curing portion
6 bonding surface
7 thermographic camera
8 temperature sensor
9 adhesive
10 fiber composite structure
100 aircraft
M method
M1-M6 method steps

The invention claimed is:

1. A method for bonding two thermoset fiber composite components with each other to form a fiber composite structure of an aircraft, comprising:

integrating conductive fibers underneath a bonding surface of at least one of the two thermoset fiber composite components, each conductive fiber comprising a carbon fiber coated with an electrically insulating coating, the conductive fibers running along the bonding surface and protruding at least at conductive fiber ends from a respective thermoset fiber composite component;

arranging the two thermoset fiber composite components against each other at respective bonding surfaces of the two fiber thermoset composite components;

passing an electric current through the conductive fibers by electrically contacting the conductive fibers at the protruding conductive fiber ends so that the respective thermoset fiber composite component is heated at the bonding surface to a curing temperature of the thermoset fiber composite component; and joining the two thermoset fiber composite components with each other at the respective bonding surfaces via secondary bonding, co-bonding and/or co-curing at the curing temperature, thereby forming the fiber composite structure, wherein the two thermoset fiber composite components are formed with a matrix material at least at one of the respective bonding surfaces curable under application of the curing temperature.

2. The method according to claim 1, wherein the electrically insulating coating is a polymer electrolyte coating.

3. The method according to claim 1, wherein joining comprises pressing the two thermoset fiber composite components against each other at the bonding surfaces.

4. The method according to claim 1, wherein arranging comprises providing an adhesive between the bonding surfaces.

5. The method according to claim 1, wherein the conductive fibers are arranged in a form of at least one of single fibers, bundles, tapes, scrims, mats, woven fabrics and fleece.

6. The method according to claim 1, further comprising:
measuring the curing temperature; and
controlling the electric current based on the measured curing temperature.

7. The method according to claim 6, wherein the curing temperature is measured with at least one of a thermographic camera and a temperature sensor integrated in at least one of the fiber composite components.

8. The method according to claim 1, wherein the curing temperature is below 150° C.

* * * * *